March 28, 1961 E. W. GORTER ET AL 2,977,312

FERROMAGNETIC MATERIAL

Filed May 16, 1957 4 Sheets-Sheet 1

INVENTORS
E.W. GORTER
G.H. JONKER
H.P.J. WIJN
J.A. SCHULKES

BY Frank R. Jifani
AGENT

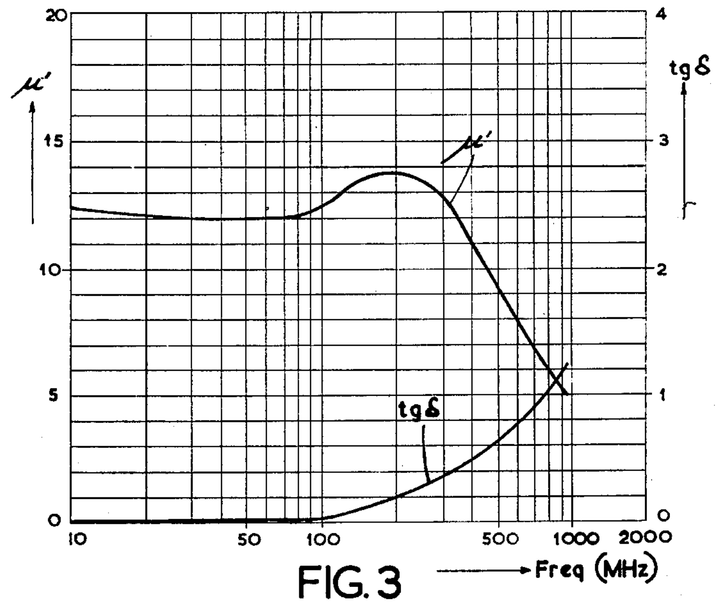
FIG. 3 → Freq (MHz)
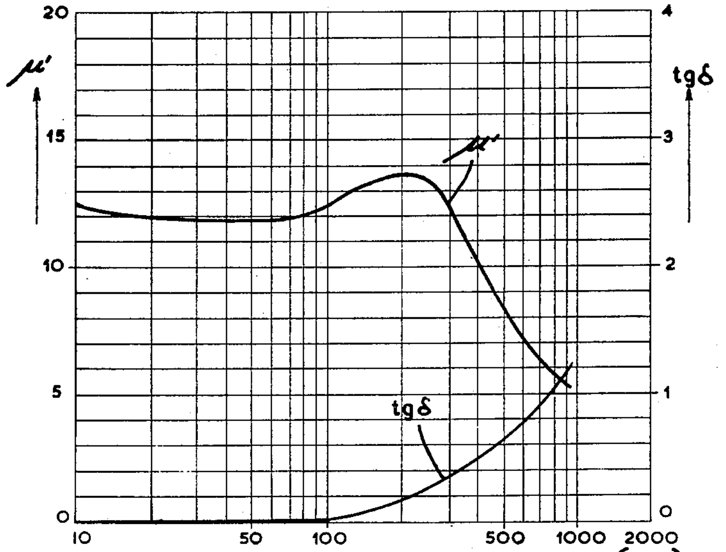
FIG. 4 → Freq (MHz)
INVENTORS
E. W. GORTER
G. H. JONKER
H. P. J. WIJN
J. A. SCHULKES
BY
Frank R. Trifari
AGENT March 28, 1961 E. W. GORTER ET AL 2,977,312

FERROMAGNETIC MATERIAL

Filed May 16, 1957 4 Sheets-Sheet 3

INVENTORS
E.W. GORTER
G.H. JONKER
H.P.J. WIJN
J.A. SCHULKES

BY Frank R. Jeifari
AGENT

March 28, 1961 E. W. GORTER ET AL 2,977,312

FERROMAGNETIC MATERIAL

Filed May 16, 1957 4 Sheets-Sheet 4

INVENTORS
E.W. GORTER
G.H. JONKER
H. P. J. WIJN
J. A. SCHULKES

BY Frank R. Jefani
AGENT 2,977,312

FERROMAGNETIC MATERIAL

Evert Willem Gorter, Gerard Heinrich Jonker, Henricus Petrus Johannes Wijn, and Johannes Antonius Schulkes, all of Eindhoven, Netherlands, assignors to North American Philips Company, Inc., New York, N.Y., a corporation of Delaware Filed May 16, 1957, Ser. No. 659,516

Claims priority, application Netherlands May 16, 1956

4 Claims. (Cl. 252—62.5)

Figure 1:
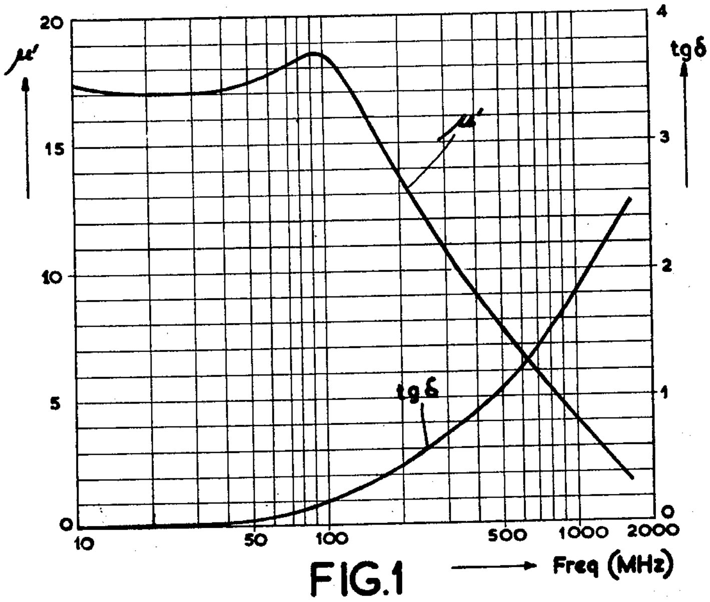

This invention relates to a ferromagnetic material and method of making the same. In particular, it relates to a ferromagnetic material adapted to be used at frequencies up to at least 200 megacycles per second.

It is known that certain ferromagnetic ferrites having a spinel structure are adapted to be used at frequencies up to several megacycles per second but that the initial permeability of such ferrites is not independent of the frequency, that is, there is a frequency range in which the initial permeability decreases with an increase in frequency. Moreover, such ferrites generally exhibit an increase in losses with an increase in frequency which limits the upper frequency at which they can be satisfactorily used.

A principal object of this invention is to provide a novel ferromagnetic material adapted to be used at frequencies up to at least 200 megacycles per second.

A further object of this invention is to provide a novel ferromagnetic material having an initial permeability substantially constant up to much higher frequencies than in the ferromagnetic ferrites having a spinel structure.

A still further object of this invention is to provide an electrically non-conductive ferromagnetic material having low magnetic losses at frequencies up to at least 200 megacycles per second.

Another object of this invention is to provide a novel ferromagnetic material having permanent magnetic properties.

Still another object of this invention is to provide a novel ferromagnetic material for use in microwave apparatus.

These and further objects of the invention will appear as the specification progresses.

In accordance with the invention it has been found that materials which consist essentially of crystals having the composition $$Ba_{(3-a-b-c)}Sr_aPb_bCa_cMe^{II}_{(2-d)}Co_dFe_{24}O_{41}$$

in which $Me^{II}$ is a bivalent metal selected from the group consisting of $Mn^{II}$, $Fe^{II}$, $Ni^{II}$, $Cu^{II}$, $Zn^{II}$, $Mg^{II}$, and the bivalent metal complex $$\frac{Li^{I}+Fe^{III}}{2}$$

and in which $a$ has a value varying from 0 to 1, $b$ has a value varying from 0 to 0.6, $c$ has a value varying from 0 to 0.3, and $d$ has a value less than 2, the crystals having a structure, the elementary cell of which can be described in the hexagonal system by a $c$ axis of about 52.3 A. and an $a$ axis of about 5.9 A., exhibit ferromagnetic properties.

In ferromagnetic materials of hexagonal crystal structure, the crystal anisotropy is given as a first approximation by the expression $$F_K=K_1' \sin^2 \vartheta$$

(see R. Becker and W. Döring, "Ferromagnetismus," 1939, page 114). If for a crystal $K_1'$ is positive (so-called "positive" crystal anisotropy), in this crystal the hexagonal axis is the preferred direction of magnetization. If, however, $K_1'$ is negative (which condition will hereinafter be referred to as "negative" crystal anisotropy), this means that the spontaneous magnetization is directed at right angles to the hexagonal axis and consequently parallel to the basal plane of the crystal. In the latter case, the crystal has a so-called "preferred plane" of magnetization (there may, however, still be a comparatively weak preference of the magnetization for certain directions in the basal plane). In part of the novel materials under consideration, $K_1'$ is negative. In this event, in each crystal the direction of the spontaneous magnetization lies in the basal plane and in this plane the direction of magnetization is more readily rotatable than in a direction which does not lie in this plane. In these materials, the initial permeability has values which are high enough to be of interest for electrotechnical use. This initial permeability is constant up to a far higher frequency than in ferromagnetic ferrites of spinel structure having equal values of the initial permeability at low frequency. The materials in accordance with the invention showing positive crystal anisotropy offer novel possibilities of manufacturing, for example, ferromagnetic bodies having permanent magnetic properties and ferromagnetic bodies for use, in microwave apparatus.

In order to decide whether in a given case crystals having a preferred direction of magnetization or crystals having a preferred plane of magnetization are involved; use may be made of the following identification test:

A small amount, for example 25 mgs., of the crystal material to be examined is mixed as a fine powder with a few drops of a solution of an organic binder or adhesive in acetone, the mixture being spread on a glass slide. This slide is arranged between the poles of an electromagnet so that the lines of magnetic force are at right angles to the surface of the slide. By gradually increasing the electric direct-current of the electromagnet, the magnetic field strength is increased, so that the powder particles rotate in the field in a manner such that either the preferred direction or the preferred plane of magnetization becomes substantially parallel to the direction of the lines of magnetic force. By proceeding carefully, coagulation of the powder particles can be avoided. After evaporation of the acetone, the powder particles adhere to the glass surface in a magnetically oriented condition. By means of radiographs it can now be determined which orientation of the powder particles has been produced by the action of the magnetic field. This can be effected, for example, with the aid of an X-ray diffractometer (for example an apparatus as described in "Philips' Technical Review," 16, pages 123–133, 1954–1955), an enhanced occurence of the reflections at planes at right angles to the hexagonal $c$-axis (so-called "001-reflections") being observed in the case of a preferred direction parallel to this $c$-axis as compared with a radiograph of a non-oriented specimen. In the case of a preferred plane at right angles to the hexagonal $c$-axis, an enhanced occurrence of reflections at planes parallel to this $c$-axis (so-called "$hk0$-reflections") is observed.

The crystal anisotropy constant $K_1'$ varies with the chemical composition and also, for each material, depends upon the temperature. In many of the novel materials under consideration, it has been found possible to determine a temperature below which the crystal anisotropy is negative and above which it is positive. The temperature of the reversing point of the crystal anisotropy depends principally upon the cobalt content. The reversing point lies at room temperature if the value of $d$ in the aforesaid formula is equal to about 0.5. If the value of $d$ is more than about 0.5, materials are obtained the crystals of which show a preferred plane of magnetization at room temperature. If the value of $d$ is less than about 0.5, materials are obtained the crystals of which have a preferred direction of the magnetization at room temperature. It will be obvious that the choice of the material is determined by the fact whether a positive or a negative crystal anisotropy is desired within the operating range.

It has also been found that the materials which contain copper have a comparatively high specific resistivity. This shows itself in the value of the loss factor, which in these materials is lower than in materials which contain no copper and which have the same value of the initial permeability.

The production of the materials according to the invention is preferably effected by heating (sintering) a finely powdered mixture of the component metal oxides of the novel compounds in about correct proportions. Obviously, at least one of the component metal oxides can be wholly or partially replaced by compounds which can be converted into metal oxides by heating, for example carbonates, oxalates and acetates. In addition the component metal oxide can be wholly or partially replaced by one or more previously produced reaction products of at least two of the component metal oxides. In these cases as the additional material use is preferably made of a reaction product which contains iron, is produced at low temperature, preferably a temperature of less than 1100° C. and has a crystal structure similar to that of the mineral magneto-plumbite, for example $BaFe_{12}O_{19}$. The term "correct proportions" as used herein is to be understood to mean proportions of the amounts of the metals in the initial mixture equal to those in the materials to be produced.

If desired, the finely powdered initial material may be pre-sintered, the reaction product being again ground and the powder thus produced being re-sintered, and this sequence of operations may be repeated once or several times. This latter method of sintering is known per se, for example in the production of ferromagnetic ferrites of spinel structure (see inter alia J. J. Went and E. W. Gorter, "Philips' Technical Review," 13 page 183, 1951–1952). The temperature of the sintering process or the final sintering process is chosen between about 1000° C. and about 1400° C., preferably between 1200° C. and 1350° C.

In order to promote the sintering process, sintering agents, for example silicates and fluorides, may be added. Bodies consisting of the above described ferromagnetic materials can be obtained either by immediately sintering the initial mixture of the metal oxides or the like in the desired shape or by pulverizing the reaction product of the presintering process and shaping it, if required, after the addition of a binder, into the desired form, after which it may be re-sintered or hardened.

By sintering at a temperature materially exceeding 1200° C. and/or by sintering in a gas atmosphere whose oxygen content is comparatively small, crystals can be produced having a comparatively high proportion of $Fe^{II}$, so that the specific resistivity can be reduced to values of less than 10 ohm.-cm. If this is not desired, since the material is to be used as the initial material for magnetic cores for use at high frequencies without the occurrence of excessive eddy current losses, excessive formation of ferro-ions must be avoided or any excessive amount of ferro-ions must subsequently be oxidized to ferric-ions in known manner, e.g. by heating again in oxygen at a temperature between 1000° C. and 1250° C.

When producing the materials in accordance with the invention which contain lead, special precautions must be taken. As a result of the volatility of the PbO, a part thereof will escape from the product during the heat treatment so that it is desirable for a larger quantity of lead to be provided in the initial mixture than corresponds to the proportions of the metals in the material to be produced.

As is usual, the electromagnetic losses are indicated by a loss factor tan $\delta=\mu''/\mu'$ (see J. Smit and H. P. J. Wijn, "Advances in Electronics," VI, 1954, page 69, formula number 37). The quantity $\mu'$ is the so-called "real" part of the initial permeability. This quantity and tan $\delta$ will be given as numerical values in the Examples III to XIII.

The invention will be described with reference to the accompanying drawing in which Figs. 1 to 7 are curves showing the frequency dependence of $\mu'$ and tan $\delta$ of materials according to the invention.

EXAMPLE I

A mixture of barium carbonate, ferric oxide and cobalt carbonate in mutual proportions according to the formula $Ba_3Co_2Fe_{24}O_{41}$ was ground with alcohol in a rotating ball mill for half an hour. After drying, the ground mixture was presintered in air at about 1000° C. The reaction product was subsequently ground again with alcohol in a rotating ball mill for one hour. After drying, a small amount of a solution of an organic binder was added and part of the mixture thus obtained was compressed into a tablet which was sintered in oxygen at a temperature between 1280° C. and 1300° C. for one hour.

Similarly, tablets having compositions according to the formulae $Ba_3Co_{0.65}Zn_{1.35}Fe_{24}O_{41}$, $Ba_3Co_{0.5}Zn_{1.5}Fe_{24}O_{41}$, $Ba_3Zn_2Fe_{24}O_{41}$, $Ba_3Mg_2Fe_{24}O_{41}$ and $Ba_3Ni_2Fe_{24}O_{41}$, were made from mixtures of barium carbonate, ferric oxide together with cobalt carbonate and zinc oxide, cobalt carbonate and zinc oxide, zinc oxide, magnesium carbonate and nickel oxide, respectively.

X-ray examination showed that the reaction products consisted entirely of crystals having the desired structure. Furthermore, in the manner described hereinbefore, the sign of the crystal anisotropy at room temperature of these materials was determined by X-ray examination. The results are listed in Table No. 1 under Nos. 1–6. The saturation magnetization of all these materials is higher than 40 gauss cc./gm.

EXAMPLE II

The compound $Ba_{0.6}Sr_{0.4}Fe_{12}O_{19}$ was produced by heating a mixture of $BaCO_3$, $SrCO_3$ and $Fe_2O_3$ in the correct proportions to a temperature of 1000° C. for 15 hours. From this compound, $BaCO_3$ and $CoCO_3$, a mixture was made in a ratio of 2 mols of $Ba_{0.6}Sr_{0.4}Fe_{12}O_{19}$, 1 mol of $BaCO_3$ and 2 mols of $CoCO_3$, which corresponds to the desired compound $Ba_{2.2}Sr_{0.8}Co_2Fe_{24}O_{41}$. The mixture was ground together with alcohol in an oscillating mill for 4 hours. After the product had been dried, a small amount of a solution of an organic binder was added to it and part of the final product was compressed into a tablet, which was fired at a temperature of 1260° C. in oxygen for 1 hour.

Similarly, a tablet was made from a mixture of $Ba_{0.6}Sr_{0.4}Fe_{12}O_{19}$, $BaCO_3$, $CoCO_3$ and ZnO in a ratio of 2 mols of $Ba_{0.6}Sr_{0.4}Fe_{12}O_{19}$, 1 mol of $BaCO_3$, 1.5 mol of $CoCO_3$ and 0.5 mol of ZnO, which corresponds to the desired compound $Ba_{2.2}Sr_{0.8}Co_{1.5}Zn_{0.5}Fe_{24}O_{41}$.

From a mixture of $Ba_{0.8}Sr_{0.2}Fe_{12}O_{19}$ (this compound being produced from barium carbonate, strontium carbonate and ferric oxide in the manner described hereinbefore), $BaCO_3$ and ZnO, in a ratio of 2 mols of $Ba_{0.8}Sr_{0.2}F_{12}O_{19}$, 1 mol of $BaCO_3$ and 2 mols of ZnO, which corresponds to the desired compound $$Ba_{2.6}Sr_{0.4}Zn_2Fe_{24}O_{41}$$

a tablet was also made in the same manner.

Finally a tablet was made in this manner from a mixture of $Ba_{0.85}Ca_{0.15}Fe_{12}O_{19}$ (this compound being produced from barium carbonate, calcium carbonate and ferric oxide in the manner described hereinbefore), $BaCO_3$ and MgO in a ratio of 2 mols of $$Ba_{0.85}Ca_{0.15}Fe_{12}O_{19}$$

1 mol of $BaCO_3$ and 2 mols of MgO, which corresponds to the desired compound $Ba_{2.7}Ca_{0.3}Mg_2Fe_{24}O_{41}$.

X-ray examination showed that the reaction products consisted substantially entirely of crystals having the desired structure. In the manner described hereinbefore, the sign of the crystal anisotropy of these materials at room temperature was determined by X-ray examination. The results are given in Table No. 1 under Numbers 7–10. The saturation magnetization of all these materials is higher than 40 gauss cc./gm.

Under the heading "main constituent," Tables No. 1 and No. 2 give chemical formulae which were derived from the composition of the initial mixture and from the X-ray examination.

*Table No. 1.—Crystal anisotropy at room temperature of some ferromagnetic materials in accordance with the invention*

| No. | Main constituent | Sign of the crystal anisotropy |
|---|---|---|
| 1 | $Ba_3Co_2Fe_{24}O_{41}$ | − |
| 2 | $Ba_3Co_{0.65}Zn_{1.35}Fe_{24}O_{41}$ | − |
| 3 | $Ba_3Co_{0.5}Zn_{1.5}Fe_{24}O_{41}$ | + |
| 4 | $Ba_3Zn_2Fe_{24}O_{41}$ | + |
| 5 | $Ba_3Mg_2Fe_{24}O_{41}$ | + |
| 6 | $Ba_3Ni_2Fe_{24}O_{41}$ | + |
| 7 | $Ba_{2.2}Sr_{0.8}Co_2Fe_{24}O_{41}$ | − |
| 8 | $Ba_{2.2}Sr_{0.8}Co_{1.5}Zn_{0.5}Fe_{24}O_{41}$ | − |
| 9 | $Ba_{2.6}Sr_{0.4}Zn_2Fe_{24}O_{41}$ | + |
| 10 | $Ba_{2.7}Ca_{0.3}Mg_2Fe_{24}O_{41}$ | + |

EXAMPLE III

A mixture of barium carbonate, ferric oxide and cobalt carbonate in a ratio according to the formula $Ba_3Co_2Fe_{24}O_{41}$ was ground with alcohol in a rotating ball mill for 15 hours and subsequently prefired in oxygen at 1100° C. for 2 hours. After cooling the reaction product was again ground with alcohol for 15 hours. Part of the powder thus obtained was compressed to form a ring which was fired at 1280° C. in oxygen for 2 hours.

Similarly, from mixtures of barium carbonate, ferric oxide, cobalt carbonate and zinc oxide in a ratio according to the formulae $Ba_3Co_{1.5}Zn_{0.5}Fe_{24}O_{41}$ and $$Ba_3Co_{1.0}Zn_{1.0}Fe_{24}O_{41}$$

rings were produced which, as was shown by X-ray examination, entirely consisted of crystals having the desired structure.

The initial permeability and the loss factor of the rings thus produced were measured at room temperature at various frequencies. The results are shown under Nos. 1–3 in Table No. 2.

EXAMPLE IV

The materials $Ba_3Co_2Fe_{24}O_{41}$, $Ba_3Co_{1.5}Mg_{0.5}Fe_{24}O_{41}$, $Ba_3CoMgFe_{24}O_{41}$, $Ba_3Co_{1.8}Li_{0.1}Fe_{24.1}O_{41}$ $$Ba_3Co_{1.5}Fe^{II}_{0.5}Fe^{III}_{24}O_{41}$$

$$Ba_3Co_{1.5}Ni_{0.5}Fe_{24}O_{41},\ Ba_3Co_{1.2}Mn_{0.8}Fe_{24}O_{41}$$

$Ba_3Co_{1.5}Cu_{0.5}Fe_{24}O_{41}$ and $Ba_3CoCuFe_{24}O_{41}$ were produced from barium carbonate, ferric oxide, cobalt carbonate, magnesium oxide, lithium carbonate, nickel oxide, manganese carbonate and copper oxide in compositions according to the formulae. In the specimen containing bivalent iron the required amount of trivalent iron was converted into bivalent iron by a suitable method of firing. However, the proportion of bivalent iron in the final product was not determined absolutely, so that it can be slightly different from the value given in the table.

The mixtures were ground with alcohol in a ball-mill for half an hour, dried and presintered, for example at about 1000° C. for 10 hours or at 1100° C. for 1 hour. The reaction products were again ground in a ball mill for one hour and the powder obtained was mixed with a binder and compressed to form rings. Generally, these rings were fired in oxygen at a temperature between 1280° C. and 1300° C. for about 1 hour. In the production of the specimen containing lithium, a lower firing temperature of about 1250° C. was used in order to prevent loss of lithium by evaporation. Hence the density and consequently the initial permeability also of this specimen were comparatively low. The specimen containing bivalent iron was produced by firing in industrial nitrogen, that is to say nitrogen containing about 1% by volume of oxygen. X-ray examination showed that the reaction products entirely consisted of crystals having the desired structure. The properties of the rings are listed under Nos. 4–12 in Table No. 2.

EXAMPLE V

A mixture of barium carbonate, cobalt carbonate, zinc oxide and ferric oxide in proportion according to the formula $Ba_3Co_{0.8}Zn_{1.2}Fe_{24}O_{41}$ was ground with alcohol in a rotating ball mill for 16 hours, dried and prefired at 1250° C. in an oxygen stream for 2 hours. The product was ground in a mortar to produce grains having a diameter of at the most 0.5 mm. These grains were again ground with alcohol in an oscillating mill for 8 hours. Part of the powder obtained was compressed into a ring which was sintered in an oxygen stream at 1240° C. for 2 hours. X-ray examination showed that the reaction product entirely consisted of crystals having the desired structure. On the ring produced, a $\mu'$ of 23.7 and a tan $\delta$ of 0.08 were measured at a frequency of 10 megacycles per second. The same values were obtained by measuring at a frequency of 80 megacycles per second, whilst at a frequency of 155 megacycles per second a $\mu'$ of 25.2 and a tan $\delta$ of 0.21 were measured.

EXAMPLE VI

By heating a mixture of $BaCO_3$ and $Fe_2O_3$ in a molar ratio of 1:5.6 to a temperature of 900° C. for 15 hours, a material was produced which substantially consisted of the compound $BaFe_{12}O_{19}$. A batch of 33 gms. of this material was mixed with 2.37 gms. of $BaCO_3$, 2.18 gms. of $CoCO_3$ and 0.35 gm. of MgO (which corresponds to a desired compound $Ba_3Co_{1.5}Mg_{0.5}Fe_{24}O_{41}$), another batch of 33 gms. of it was mixed with 2.37 gms. of $BaCO_3$, 1.45 gms. $CoCO_3$ and 0.70 gm. MgO (which corresponds to a desired compound $Ba_3CoMgFe_{24}O_{41}$), and still another batch of 33 gms. of it was mixed with 2.37 gms. of $BaCO_3$, 2.18 gms. of $CoCO_3$ and 0.53 gm. of NiO (which corresponds to a desired compound $Ba_3Co_{1.5}Ni_{0.5}Fe_{24}O_{41}$). The mixtures were ground with alcohol in a porcelain ball mill for 4 hours. After drying, rings were pressed from the product and fired at a temperature of 1270° C. in oxygen for 1 hour. X-ray investigation showed that the reaction products consisted of crystals having the desired structure. The properties of the rings are listed under Nos. 13–15 in Table No. 2. At a frequency of 900 megacycles per second, No. 13 had a $\mu'$ of 6.4 and a tan $\delta$ of 0.69 and No. 15 a $\mu'$ of 4.9 and a tan $\delta$ of 0.97.

EXAMPLE VII

The compound $BaFe_{12}O_{19}$ was produced by heating a mixture of $BaCO_3$ and $Fe_2O_3$ in the correct ratio at 1000° C. for 15 hours. This compound was mixed with $BaCO_3$, $CoCO_3$ and ZnO in a ratio of 2 mols of $BaFe_{12}O_{19}$, 1 mol of $BaCO_3$, 1.5 mol of $CoCO_3$ and 0.5 mol of ZnO, which corresponds to the desired compound $Ba_3Co_{1.5}Zn_{0.5}Fe_{24}O_{41}$. The mixture was ground with alcohol in a porcelain ball mill for 4 hours. After drying, rings were pressed from the product and fired at 1280° C. in oxygen for 1 hour. X-ray investigation showed that the reaction product consisted of crystals having the desired structure. The properties of the rings are listed under No. 16 in Table No. 2.

EXAMPLE VIII

The compound $BaFe_{12}O_{19}$ was produced by heating a mixture of $BaCO_3$ and $Fe_2O_3$ in the correct ratio at 1150° C. in air. 55.57 gms. of this product and 4.95 gms. of $BaCO_3$ were mixed with:

2.06 gms. of $CoCO_3$ and 2.78 gms. of ZnO, the mixture corresponding to a desired compound $$Ba_3Co_{0.65}Zn_{1.35}Fe_{24}O_{41}$$

(Fig. 1);

2.27 gms. of $CoCO_3$ and 2.65 gms. of ZnO, the mixture corresponding to a desired compound $$Ba_3Co_{0.72}Zn_{1.28}Fe_{24}O_{41}$$

Figure 2:
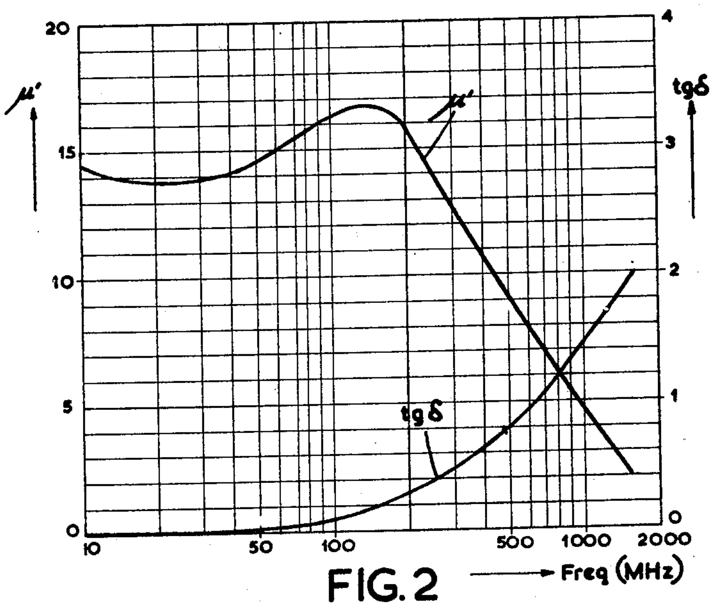

(Fig. 2);

2.56 gms. of $CoCO_3$ and 2.58 gms. of ZnO, the mixture corresponding to a desired compound $$Ba_3Co_{0.8}Zn_{1.2}Fe_{24}O_{41}$$

(Fig. 3)

2.88 gms. of $CoCO_3$ and 2.27 gms. of ZnO, the mixture corresponding to a desired compound $$Ba_3Co_{0.9}Zn_{1.1}Fe_{24}O_{41}$$

(Fig. 4);

3.20 gms. of $CoCO_3$ and 2.07 gms. of ZnO, the mixture corresponding to a desired compound $$Ba_3CoZnFe_{24}O_{41}$$

Figure 5:
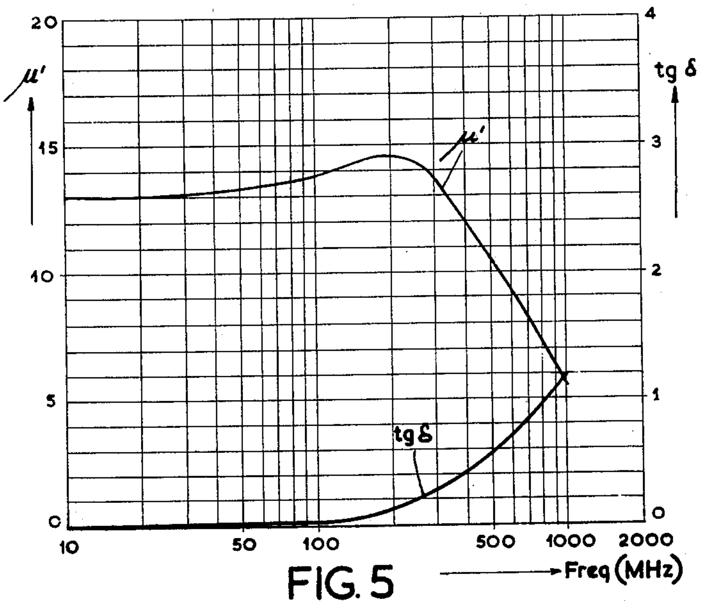
Figure 6:
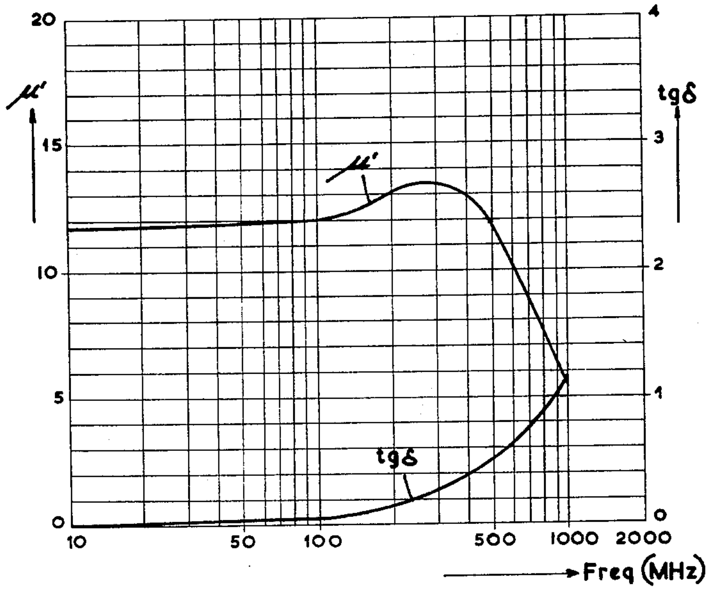
Figure 7:
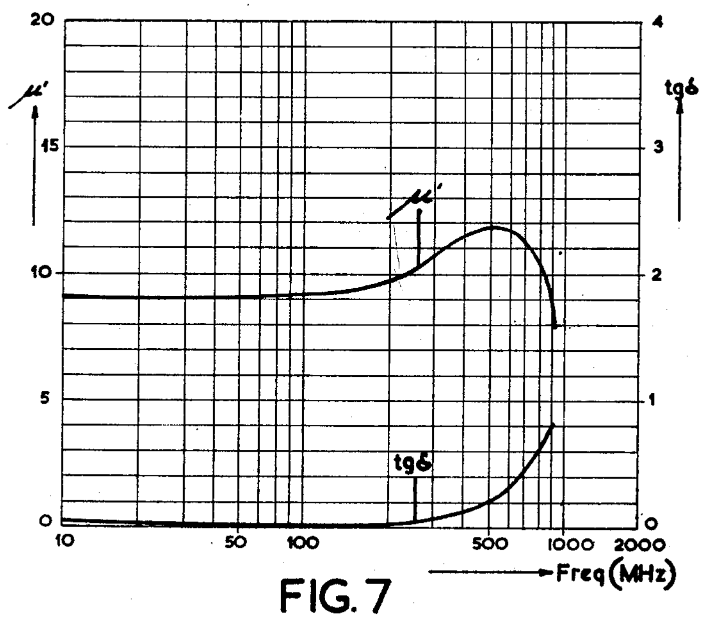

(Fig. 5);

3.52 gms. of $CoCO_3$ and 1.88 gms. of ZnO, the mixture corresponding to a desired compound $$Ba_3Co_{1.1}Zn_{0.9}Fe_{24}O_{41}$$

(Fig. 6), and 4.80 gms. of $CoCO_3$ and 1.04 gms. of ZnO, the mixture corresponding to a desired compound $$Ba_3Co_{1.5}Zn_{0.5}Fe_{24}O_{41}$$

(Fig. 7) respectively.

The mixtures were ground with acetone in an agate ball mill for 4 hours. After drying, rings were pressed from the products and fired in oxygen at 1300° C. for 4 hours. X-ray examination showed that the desired compound had actually been formed. The properties of the rings are given in Figs. 1–7.

EXAMPLE IX

The compounds $Ba_{0.8}Sr_{0.2}Fe_{12}O_{19}$ and $Ba_{0.6}Sr_{0.4}Fe_{12}O_{19}$ were produced by heating a mixture of $BaCO_3$, $SrCO_3$ and $Fe_2O_3$ in the correct ratio at 1000° C. for 15 hours. From these compounds $BaCO_3$, and ZnO, mixtures were made in a ratio of 2 mols of $(Ba,Sr)_1Fe_{12}O_{19}$, 1 mol of $BaCO_3$, 1.5 mols of $CoCO_3$ and 0.5 mol of ZnO, which corresponds to the desired compounds $$Ba_{2.6}Sr_{0.4}Co_{1.5}Zn_{0.5}Fe_{24}O_{41}$$

and $$Ba_{2.2}Sr_{0.8}Co_{1.5}Zn_{0.5}Fe_{24}O_{41}$$

The mixtures were ground with alcohol in a porcelain ball mill for 4 hours. After drying, a small amount of a solution of an organic binder was added to each product, from which subsequently rings were pressed which were fired at 1280° C. in oxygen for 1 hour. X-ray examination showed that the reaction products consisted substantially entirely of crystals having the desired structure. The properties of the rings are listed under Nos. 17 and 18 in Table No. 2.

EXAMPLE X

The compound $Ba_{0.85}Ca_{0.15}Fe_{12}O_{19}$ was produced by heating a mixture of $BaCO_3$, $CaCO_3$ and $Fe_2O_3$ in the correct ratio at 1000° C. for 15 hours. From this compound and $BaCO_3$, $CoCO_3$ and MgO, a mixture was made in a ratio of 2 mols of $Ba_{0.85}Ca_{0.15}Fe_{12}O_{19}$, 1 mol of $BaCO_3$, 1 mol of $CoCO_3$ and 1 mol of MgO, which corresponds to the desired compound $Ba_{2.7}Ca_{0.3}CoMgFe_{24}O_{41}$. From this mixture, rings were produced in the manner described in Example IX and X-ray examination of the rings showed, they consisted substantially entirely of crystals having the desired structure. The properties of these rings are given under No. 19 in Table No. 2.

EXAMPLE XI

The compound $Ba_{0.85}Pb_{0.15}Fe_{12}O_{19}$ was produced by heating a mixture of $BaCO_3$,$PbCO_3$ and $Fe_2O_3$ in the correct ratio at 1000° C. for 15 hours. From this compound, $BaCO_3$, $CoCO_3$ and CuO, a mixture was made in a ratio of 2 mols of $Ba_{0.85}Pb_{0.15}Fe_{12}O_{19}$, 1 mol of $BaCO_3$, 1.5 mol of $CoCO_3$ and 0.5 mol of CuO, which corresponds to the desired compound $Ba_{2.7}Pb_{0.3}Co_{1.5}Cu_{0.5}Fe_{24}O_{41}$. To this mixture, a quantity of $PbCO_3$, which is equal to 5% by weight of the mixture, was added in view of the volatility of PbO, part of which escaped during firing. From this mixture, rings were produced in the manner described in Example IX, however, they were fired at 1240° C. instead of at 1280° C. X-ray examination showed that the reaction product consisted substantially entirely of crystals having the desired structure. The properties of the rings are given under No. 20 in Table No. 2.

EXAMPLE XII

A mixture of 6.5 gms. of $BaCO_3$, 1.77 gms. of $SrCO_3$, 2.33 gms. of $CoCO_3$, 0.61 gm. of ZnO and 28.8 gms. of $Fe_2O_3$, which corresponds to the desired compound $Ba_{2.2}Sr_{0.8}Co_{1.5}Zn_{0.5}Fe_{24}O_{41}$, was ground with alcohol in a porcelain ball mill. The mixture was prefired in air at 1000° C. for 15 hours. The reaction product was again ground for half an hour. After the addition of a small amount of an organic binder, rings were pressed from the material and fired at 1230° C. in oxygen for 2 hours. X-ray examination showed that the reaction product consisted substantially entirely of crystals having the desired structure. The properties of the rings are given under No. 21 in Table No. 2.

EXAMPLE XIII

The materials $Ba_3CoCu_{0.1}Zn_{0.9}Fe_{24}O_{41}$, $$Ba_3CoCu_{0.2}Zn_{0.8}Fe_{24}O_{41},$$

$BaCoCu_{0.3}Zn_{0.7}Fe_{24}O_{41}$ and $Ba_3CoCu_{0.4}Zn_{0.6}Fe_{24}O_{41}$ were produced from barium carbonate, cobalt carbonate, copper oxide, zinc oxide and ferric oxide. The mixtures were ground with alcohol in a rotating ball mill for 15 hours and subsequently prefired in oxygen at 1200° C. for 2 hours. After cooling the reaction products were ground with alcohol in an oscillating mill for 4–6 hours. Part of the powders thus obtained were compressed to form rings which were fired at 1240° C. in oxygen for 2 hours with the exception of the material $$Ba_3CoCu_{0.3}Zn_{0.7}Fe_{24}O_{41}$$

which was fired at 1260° C. X-ray examination showed that the reaction products consisted of crystals having the desired structure. The properties of the rings are listed under Nos. 22–25 in Table No. 2.

The measuring results given in Table No. 2, in Figs. 1–7 in Examples V and VI were obtained by measurements made on rings in the demagnetized condition at room temperature by the method described by C. M. van der Burgt, M. Gevers and H. P. J. Wijn in "Philips' Technical Review," 14, pages 246–252 (1952–1953).

The graphs of Figs. 1–7 show the relationship between $\mu'$ and tan $\delta$ to frequency for the products of Example VIII. In these graphs the values of $\mu'$ and tan $\delta$ are plotted along the ordinates and the values of the frequencies are plotted along the abscissa.

*Initial permeability and loss factor at room temperature of some materials in accordance with the invention*

| No. | Main constituent | 10 kHz. | 80 MHz. | | 260 MHz. | | 500 MHz. | |
|---|---|---|---|---|---|---|---|---|
| | | $\mu'$ | $\mu'$ | $\tan\delta$ | $\mu'$ | $\tan\delta$ | $\mu'$ | $\tan\delta$ |
| 1 | $Ba_3Co_2Fe_{24}O_{41}$ | 8.5 | 8.3 | 0.02 | 8.5 | 0.02 | 9.2 | 0.08 |
| 2 | $Ba_3Co_{1.5}Zn_{0.5}Fe_{24}O_{41}$ | 9.5 | 10.1 | 0.03 | 11.0 | 0.07 | 12.4 | 0.19 |
| 3 | $Ba_3CoZnFe_{24}O_{41}$ | 15.5 | 15.3 | 0.06 | 17.1 | 0.35 | 11.3 | 0.83 |
| 4 | $Ba_3Co_2Fe_{24}O_{41}$ | 9.5 | 9.1 | 0.03 | -------- | -------- | 9.6 | 0.29 |
| 5 | $Ba_3Co_{1.5}Mg_{0.5}Fe_{24}O_{41}$ | 8.9 | 8.2 | 0.06 | -------- | -------- | 7.8 | 0.35 |
| 6 | $Ba_3CoMgFe_{24}O_{41}$ | 9.7 | 8.8 | 0.04 | -------- | -------- | 7.0 | 0.94 |
| 7 | $Ba_3Co_{1.8}Li_{0.1}Fe_{24.1}O_{41}$ | 5.7 | 5.7 | 0.05 | 5.2 | 0.17 | -------- | -------- |
| 8 | $Ba_3Co_{1.5}Fe_{0.5}^{II}Fe_{2.}^{III}O_{41}$ | 4.5 | 4.5 | 0.03 | 4.5 | 0.14 | -------- | -------- |
| 9 | $Ba_3Co_{1.5}Ni_{0.5}Fe_{24}O_{41}$ | 9.3 | 8.9 | 0.04 | -------- | -------- | 7.7 | 0.58 |
| 10 | $Ba_3Co_{1.2}Mn_{0.8}Fe_{24}O_{41}$ | 20.5 | 17.9 | 0.10 | -------- | -------- | -------- | -------- |
| 11 | $Ba_3Co_{1.5}Cu_{0.5}Fe_{24}O_{41}$ | 10.0 | 9.0 | 0.01 | 9.0 | 0.06 | -------- | -------- |
| 12 | $Ba_3CoCuFe_{24}O_{41}$ | 7.0 | 6.4 | 0.005 | 6.0 | 0.34 | -------- | -------- |
| 13 | $Ba_3Co_{1.5}Mg_{0.5}Fe_{24}O_{41}$ | 8.9 | 8.2 | 0.06 | -------- | -------- | 7.8 | 0.35 |
| 14 | $Ba_3CoMgFe_{24}O_{41}$ | 7.9 | 8.8 | 0.04 | -------- | -------- | 7.0 | 0.94 |
| 15 | $Ba_3Co_{1.5}Ni_{0.5}Fe_{24}O_{41}$ | 9.3 | 8.9 | 0.04 | -------- | -------- | 7.7 | 0.58 |
| 16 | $Ba_3Co_{1.5}Zn_{0.5}Fe_{24}O_{41}$ | 14.6 | 13.4 | 0.04 | 14.6 | 0.16 | 14.0 | 0.55 |
| 17 | $Ba_{2.6}Sr_{0.4}Co_{1.5}Zn_{0.5}Fe_{24}O_{41}$ | 18.5 | 16.2 | 0.07 | 17.8 | 0.22 | 16.9 | 0.61 |
| 18 | $Ba_{2.2}Sr_{0.8}Co_{1.5}Zn_{0.5}Fe_{24}O_{41}$ | 12.7 | 11.8 | 0.10 | 11.4 | 0.33 | 9.8 | 0.63 |
| 19 | $Ba_{2.7}Ca_{0.3}CoMgFe_{24}O_{41}$ | 6.1 | 5.7 | 0.07 | 5.3 | 0.30 | 4.0 | 0.58 |
| 20 | $Ba_{2.7}Pb_{0.3}Co_{1.5}Cu_{0.5}Fe_{24}O_{41}$ | 4.0 | 3.8 | 0.03 | 3.9 | 0.06 | 3.9 | 0.11 |
| 21 | $Ba_{2.2}Sr_{0.8}Co_{1.5}Zn_{0.5}Fe_{24}O_{41}$ | 9.8 | 8.4 | 0.06 | 8.7 | 0.17 | 8.2 | 0.62 |
| 22 | $Ba_3CoCu_{0.1}Zn_{0.9}Fe_{24}O_{41}$ | 13.0 | -------- | -------- | 13.0 | 0.07 | -------- | -------- |
| 23 | $Ba_3CoCu_{0.2}Zn_{0.8}Fe_{24}O_{41}$ | 15.0 | -------- | -------- | 14.2 | 0.07 | -------- | -------- |
| 24 | $Ba_3CoCu_{0.3}Zn_{0.7}Fe_{24}O_{41}$ | 16.0 | -------- | -------- | 17.1 | 0.17 | -------- | -------- |
| 25 | $Ba_3CoCu_{0.4}Zn_{0.6}Fe_{24}O_{41}$ | 15.0 | -------- | -------- | 15.0 | 0.10 | -------- | -------- |

While we have described our invention in connection with specific embodiments and applications, other modifications thereof will be readily apparent to those skilled in this art without departing from the spirit and scope of the invention as defined in the appended claims.

What is claimed is:

1. A ferromagnetic material suitable for use at frequencies up to 200 megacycles per second and higher consisting essentially of crystals having a composition:

$$Ba_{(3-a-b-c)}Sr_aPb_bCa_cMe^{II}_{(2-d)}Co_dFe^{III}_{24}O_{41}$$

in which $Me^{II}$ is a bivalent metal selected from the group consisting of $Mn^{II}$, $Fe^{II}$, $Ni^{II}$, $Cu^{II}$, $Zn^{II}$, $Mg^{II}$ and the bivalent metal complex $$\frac{Li^{I}+Fe^{III}}{2}$$

and in which *a* has a value varying from 0 to 1, *b* has a value varying from 0 to 0.6, *c* has a value varying from 0 to 0.3, and *d* has a value up to about 1.8, said crystals having a structure, the elementary cell of which has in the hexagonal system a *c*-axis of about 52.3 A. and an *a*-axis of about 5.9 A.

2. A ferromagnetic material having an initial permeability exceeding 2 and low losses at frequencies up to 200 megacycles per second and higher consisting essentially of crystals having a composition:

$$Ba_{(3-a-b-c)}Sr_aPb_bCa_cMe^{II}_{(2-d)}Co_dFe^{III}_{24}O_{41}$$

in which $Me^{II}$ is a bivalent metal selected from the group consisting of $Mn^{II}$, $Fe^{II}$, $Ni^{II}$, $Cu^{II}$, $Zn^{II}$, $Mg^{II}$ and the bivalent metal complex $$\frac{Li^{I}+Fe^{III}}{2}$$

and in which *a* has a value varying from 0 to 1, *b* has a value varying from 0 to 0.6, *c* has a value varying from 0 to 0.3, and *d* has a value more than 0.5 and up to about 1.8, said crystals having a structure, the elementary cell of which has in the hexagonal system a *c*-axis of about 52.3 A. and an *a*-axis of about 5.9 A., said crystals having at ambient temperature a negative crystalline anisotropy and a preferred plane of magnetization.

3. A ferromagnetic material having permanent magnetic properties and suitable for use in microwave apparatus consisting essentially of crystals having a composition:

$$Ba_{(3-a-b-c)}Sr_aPb_bCa_cMe^{II}_{(2-d)}Co_dFe^{III}_{24}O_{41}$$

in which $Me^{II}$ is a bivalent metal selected from the group consisting of $Mn^{II}$, $Fe^{II}$, $Ni^{II}$, $Cu^{II}$, $Zn^{II}$, $Mg^{II}$ and the bivalent metal complex $$\frac{Li^{I}+Fe^{III}}{2}$$

and in which *a* has a value varying from 0 to 1, *b* has a value varying from 0 to 0.6, *c* has a value varying from 0 to 0.3 and *d* has a value up to 0.5, said crystals having a structure, the elementary cell of which has in the hexagonal system a *c*-axis of about 52.3 A., and an *a*-axis of about 5.9 A., said crystals having at ambient temperature a positive crystalline anisotropy and a preferred direction of magnetization.

4. A method of manufacturing a ferromagnetic material suitable for use at frequencies up to 200 megacycles per second and higher comprising the steps of mixing an oxide of a metal selected from the group consisting of barium, strontium, lead and calcium and ferric oxide in proportions forming upon sintering crystals having a structure corresponding to the mineral magnetoplumbite and having a composition: $Ba_{(1-x-y-z)}Sr_xPb_yCa_zFe_{12}O_{19}$ in which *x* has a value varying from 0 to 1, *y* has a value varying from 0 to 1 and *z* has a value varying from 0 to 0.4, sintering said mixture of oxides at a temperature of less than about 1100° C. to form said product, mixing said product with an oxide of a metal selected from the group consisting of barium, strontium, lead and calcium and at least one oxide of a bivalent metal selected from the group consisting of $Mn^{II}$, $Fe^{II}$, $Ni^{II}$, $Cu^{II}$, $Zn^{II}$, $Mg^{II}$, $Co^{II}$ and the bivalent metal complex $$\frac{Li^{I}+Fe^{III}}{2}$$

at least one of said bivalent metals other than cobalt always being present, in proportions yielding upon heating a product having the formula $$Ba_{(3-a-b-c)}Sr_aPb_bCa_cMe^{II}_{(2-d)}Co_dFe^{III}_{24}O_{41}$$

in which $Me^{II}$ is a bivalent metal selected from the group consisting of $Mn^{II}$, $Fe^{II}$, $Ni^{II}$, $Cu^{II}$, $Zn^{II}$, $Mg^{II}$ and the bivalent metal complex $$\frac{Li^{I}+Fe^{III}}{2}$$

and in which *a* has a value varying from 0 to 1, *b* has a value varying from 0 to 0.6, *c* has a value varying from 0 to 0.3, and *d* has a value from 0 to about 1.8, and heating said latter mixture between 1000° and 1400° C. for a time sufficient to form said latter product.

References Cited in the file of this patent

UNITED STATES PATENTS

| | | |
|---|---|---|
| 2,677,663 | Jonker et al. | May 4, 1954 |
| 2,736,708 | Crowley | Feb. 28, 1956 |
| 2,762,777 | Went et al. | Sept. 11, 1956 |
| 2,762,778 | Gorter et al. | Sept. 11, 1956 |
| 2,778,803 | Crowley | Jan. 22, 1957 |
| 2,837,483 | Hakker et al. | June 3, 1958 |
| 2,847,101 | Bergmann | Aug. 12, 1958 |
| 2,854,412 | Brockman et al. | Sept. 30, 1958 |

FOREIGN PATENTS

| | | |
|---|---|---|
| 756,383 | Germany | Oct. 20, 1952 |
| 927,259 | Germany | May 2, 1955 |
| 1,094,988 | France | Dec. 15, 1954 |

OTHER REFERENCES

Erchak et al.: J. Amer. Chem. Soc., vol. 68, pp. 2085–2093, October 1946.

"Phillips Technical Review," vol. 13, No. 7, January 1952, pp. 194–208.

"Phillips Technical Review," vol. 16, No. 5–6, November-December 1954, pp. 141–146.

"Phillips Technical Review," vol. 18, No. 6, November 1956, pp. 145–154.